April 1, 1952   T. A. McCOLLUM   2,591,575
EXPANDIBLE FASTENER INSERT
Filed April 9, 1947
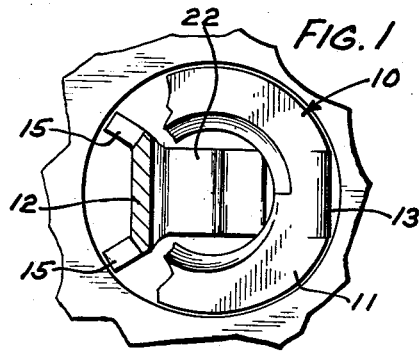
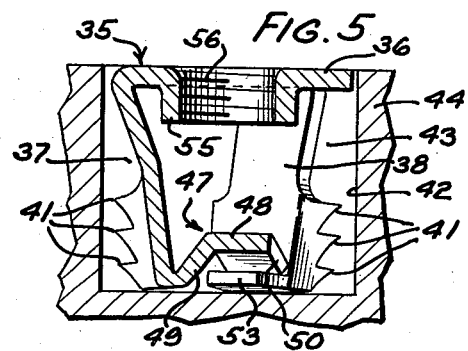
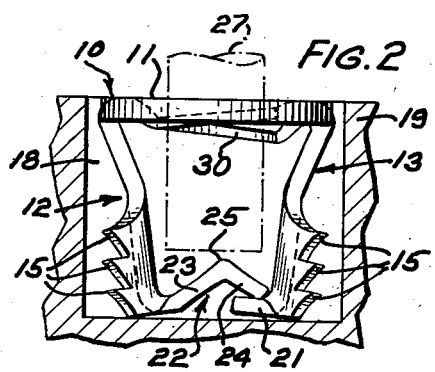
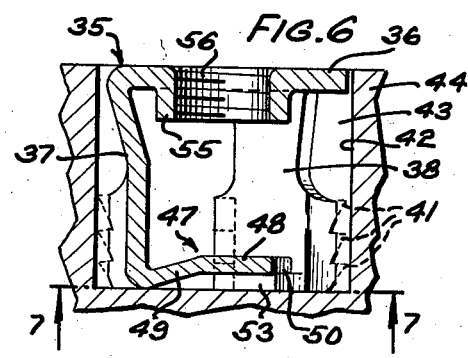
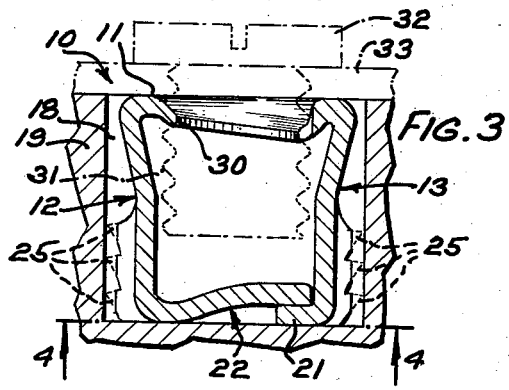
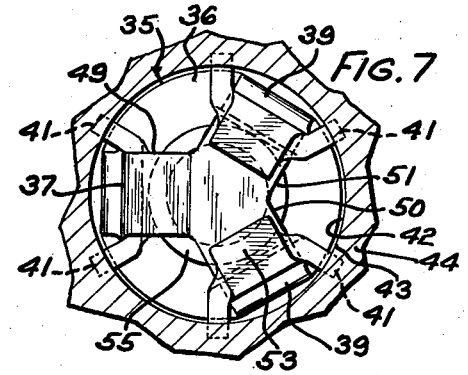
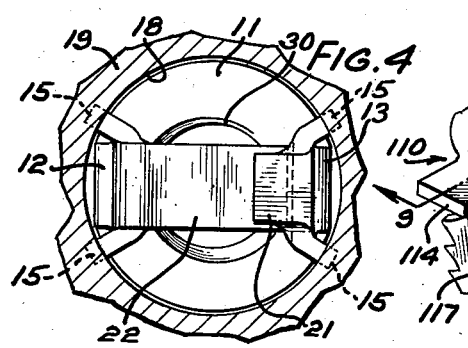
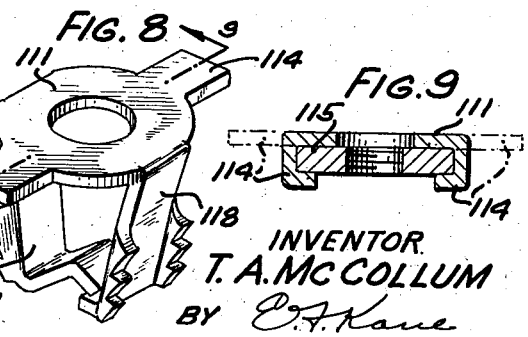
INVENTOR
T. A. McCOLLUM
BY
ATTORNEY Patented Apr. 1, 1952

2,591,575

UNITED STATES PATENT OFFICE 2,591,575

EXPANDIBLE FASTENER INSERT

Thomas A. McCollum, River Forest, Ill., assignor to Western Electric Company, Incorporated, New York, N. Y., a corporation of New York Application April 9, 1947, Serial No. 740,423

5 Claims. (Cl. 85—2)

This invention relates to a fastener insert applicable to a recessed member for attaching parts thereto and more particularly to an expandable fastener insertable in a recess in a molded plastic member and expandable into gripping engagement with the walls thereof.

In the molding of plastic articles, where it is necessary to secure parts thereto, as by means of threaded bolts, it is common practice to mold internally threaded inserts in the proper position in the articles to receive the threaded bolts, by means of which parts may be fastened to the articles. Frequently, the molded inserts are displaced, resulting in molded parts which cannot be used.

It is an object of the present invention to provide a fastener insert capable of being easily secured to a recessed member.

In one embodiment of the invention, the fastener insert, which is blanked from a single piece of sheet metal and formed to the desired shape, is provided with an annular top portion having an inner peripheral edge portion formed with a helix to receive a threaded clamping bolt and from the outer peripheral edges of the top of which a pair of legs extend in converging relation with each other and on the edges of each of the legs a series of outwardly extending teeth is formed. The end of one leg is laterally bent to form a lip thereon and the end portion of the other leg is extended to form a bent toggle member transversely disposed with respect to the leg and with the end of the toggle engaging the other leg and resting on the lip thereof. The fastener in this unexpanded condition may be inserted into a recess of a member to which it is to be attached and a punch inserted through the central aperture of the annular top of the fastener may be used to straighten the toggle and thus force the legs of the fastener outwardly and cause the teeth thereon to engage in the walls of the recess to securely lock the fastener insert to the member.

In another embodiment, the fastener is provided with three integrally formed legs extending downwardly from the outer edge of the top member in converging relation to each other and engaged at their lower ends by arms of a three-pronged toggle member formed on the end of one of the legs and which toggle member is adapted to be deformed from a bent condition to a straight condition to force the legs outwardly and thereby cause the teeth formed thereon to dig into the walls of the recess of the member to which it is to be attached.

In another embodiment, the insert may be provided with a separate nut securely attached to the fastener insert by a plurality of tongues formed integral with the top portion and bent around the edge of the nut.

The invention may be more fully understood from the following description when considered in connection with the accompanying drawings illustrating several embodiments of the invention in which Fig. 1 is an enlarged plan view of the fastener insert applied to a member;

Fig. 2 is a side elevational view of the fastener shown in Fig. 1 and which fastener insert is shown in an unexpanded condition in a recess of the member to which it is to be attached and with the toggle member for expanding the fastener in bent posiiton and indicating in dot and dash lines a punch for straightening the toggle;

Fig. 3 is a vertical axial sectional view through the fastener showing the fastener in expanded position;

Fig. 4 is a sectional view, taken on the line 4—4 of Fig. 3, showing the fastener insert in expanded position in relation to the recess in which it is mounted;

Fig. 5 is an axial sectional view of a modified form of construction showing a fastener in its unexpanded condition disposed within a recess of the member to which it is to be attached;

Fig. 6 is a view similar to Fig. 5 showing the fastener in expanded position and in assembled relation to the member;

Fig. 7 is a sectional view taken on the line 7—7 of Fig. 6 showing the fastener in elevation and in expanded relation within the recess;

Fig. 8 is a perspective view of a modified form of the invention showing an insert provided with a laterally extending wing portion thereon; and Fig. 9 is a fragmentary cross sectional view taken on the line 9—9 of Fig. 8 showing the wings of the fastener securing a nut thereto.

The fastener insert forming the subject matter of the present invention is designed primarily to replace threaded inserts molded into plastic members and it is adapted to be applied to the plastic member to serve as a means for attaching parts thereto. The member is molded with a recess of a predetermined size to receive the fastener therein and the recess has a flat bottom wall on which the fastener insert rests in unexpanded condition and has side walls into which teeth on the fastener are adapted to bite when the fastener is expanded to securely anchor the fastener insert to the plastic member. The fastener insert is provided with fastening means in the form of an internally threaded part for receiving a screw or other threaded member by means of which parts such as electrical conductors, et cetera, may be firmly fastened to the plastic member and which threaded part may be bonded or otherwise secured to the insert, but preferably is formed integral therewith.

In one embodiment of the invention, as illustrated in Figs. 1 to 4, the fastener insert 10 is made from a single sheet metal stamping and comprises a centrally apertured circular flat top portion 11, from the outer diametrically opposed edges of which depend a pair of legs 12 and 13 in converging relation to each other (Fig. 2). The side edges of the lower portion of the legs 12 and 13 are formed with a series of radially outwardly extending teeth 15—15 and the legs 12 and 13 are bent slightly intermediate their ends to provide two straight portions disposed at an angle with respect to each other to properly radially position the upper ones of the teeth 15 so as to permit the insertion of the fastener 10 into a recess 18 of a member 19 to which it is to be attached. A transversely extending lip 21 is formed on the lower end of the leg 13 and an inwardly directed transversely extending toggle member 22 is formed on the lower end of the leg 12 with the free end of the toggle member engaging the leg 13 and resting on the lip 21. The toggle member 22 comprises the straight portions 23 and 24 disposed at an angle with respect to each other to form an upwardly extending bend or knee 25, which is located substantially on the axis of the central aperture in the top portion 11.

A tool or punch 27, indicated in dot and dash lines in Fig. 2, when moved downwardly through the apertured top 11, will engage the knee 25 and force it against the bottom wall of the recess 18 to straighten the toggle from the position shown in Fig. 2 to the position shown in Fig. 3. The straightening of the toggle 22 will force the legs 12 and 13 outwardly and cause the teeth 15 thereon to be driven into the side walls of the recess 18 and thus securely anchor the fastener in the member 19. Each of the teeth 15 on the legs 12 and 13 is forced into the yieldable wall portion of the recess 18 and forms an individual socket therein so that the fastener insert is securely held in place in the member 19 by the interengagement of a plurality of angularly and axially spaced teeth 15 and the shoulders of the sockets formed in the walls of the recess 18 by the teeth 15.

The edge 30 of the aperture in the top wall 11 of the insert 10 is formed to provide one convolution of a helix, which is adapted to receive the threaded shank of a retaining screw 31, as indicated in Fig. 3. The screw 31 is provided with an enlarged head 32 and is adapted to clamp a part 33 to the member 19.

In the embodiment of the invention illustrated in Figs. 5, 6 and 7, the fastener insert 35 comprises an annular top portion 36, from the outer edge of which three legs 37, 38 and 39 extend downwardly in converging relation to each other (Fig. 6). Extending radially outwardly from the lower portion of the side edges of each of the legs 37, 38 and 39 are a series of teeth 41—41, which are adapted to be forced into the wall 42 of a recess 43 of a member 44 to which it is to be attached, when the legs are expanded outwardly from the position shown in Fig. 6 to the position shown in Fig. 7. A toggle member 47, having a knee portion 48 and three radiating arm portions 49, 50 and 51, is provided to effect the outward movement of the legs 37, 38 and 39. The toggle member 47 is formed on the end of the leg 37 and is connected thereto by the arm 49, and the arms 50 and 51 engage the legs 38 and 39, respectively, and rest upon lips 53 and 54 formed on the ends of the legs 38 and 39, respectively. The toggle 47 may be deformed from the bent position shown in Fig. 6 to the relatively straight position shown in Fig. 7 by the movement of a punch inserted through the central aperture in the plate 36. The inner peripheral edge of the top portion 36 is deformed downwardly to provide an annular flange 55, the inner surface of which may be threaded, as indicated at 56, to receive threaded attaching members (not shown). This construction of fastener insert provides additional gripping engagement between the fastener and the member 44 over the construction hereinbefore described.

In the fastener insert 110 illustrated in Figs. 8 and 9, the top portion 111 thereof is centrally apertured, as at 112, and is provided with a pair of diametrically opposed wings or tongues 114—114, which are adapted to be bent around the edges of a separate nut 115 (Fig. 9) to hold the nut securely in place on the fastener insert. The nut 115 fits against the top portion 111 and has a non-circular contour with side edge portions fitting between and snugly engaging the leg portions 117 and 118 of the fastener insert, which leg portions, together with the tongues 114—114, serve to prevent rotary movement of the nut.

If desired, the fastener insert may be provided with integrally formed tongues 114, which may be formed as illustrated in Fig. 8 or otherwise suitably shaped to serve as means for attaching parts thereto, as, for example, for bonding conductors or other parts thereto.

What is claimed is:

1. A fastener insert for attachment to the side walls of a recess in a relatively soft member comprising a sheet metal member having a top portion provided with a centrally disposed aperture, a pair of leg portions bent transversely to said top portion and arranged in opposite and converging relation to each other, outwardly directed teeth formed on the side edges of the leg portions, an inwardly projecting lip formed on the end of one of the leg portions, and a lever portion on the end of said other leg portion extending transversely therefrom into engagement with said one leg portion and the lip thereon, said lever portion being bent intermediate its ends toward said top portion to form a V-shaped toggle member having its ends operatively connected to said leg portions and adapted to be straightened by the axial movement of a member inserted through the aperture in said top portion to cause the leg portions to move outwardly and force the teeth thereon into the walls of said recess.

2. A fastener for attachment to the side walls of a cylindrical recess in a relatively soft member comprising a sheet metal member having a top portion provided with a centrally disposed aperture, part engaging and retaining means on said top portion, a pair of leg portions bent transversely to said top portion and arranged in diametrically opposed relation to each other, outwardly directed teeth formed on the side edges of the leg portions, an inwardly projecting lip formed on the end of one of said leg portions, and a spreader portion on the end of said other leg portion extending transversely therefrom into engagement with the one leg portion and the lip thereon, said spreader portion being bent intermediate its ends toward said top portion to form a V-shaped toggle member adapted to be straightened by the axial movement of a member inserted through the aperture in said top portion to cause the leg portions to move outwardly and force the teeth thereon into the walls of said recess.

3. A fastener insert applicable to a part by being inserted in a recess therein and expanded into rigid attachment with the walls thereof comprising a single sheet metal member having a top portion provided with a centrally disposed aperture, a pair of leg portions bent transversely to said top portion in converging relation to each other, said legs being spaced equi-distant from and diametrically opposite the axis of said aperture and having outwardly directed teeth formed on the side edges of the leg portions, an inwardly projecting lip formed on the end of one of said leg portions, and a lever portion on the end of said other leg portion extending transversely therefrom and having its end in engagement with the one leg portion and the lip thereon, said lever portion having its intermediate portion deformed toward said top portion and accessible through said aperture and adapted to be straightened by the axial movement of a punch inserted through the aperture in said top portion to cause the leg portions to move outwardly and force the teeth thereon into the walls of said recess.

4. A fastener comprising a single sheet metal member having a top provided with a central aperture therein, a plurality of legs on said top bent transversely thereto and spaced equi-distant from and equi-angularly about the axis of said aperture, outwardly projecting teeth formed on the side edges of said legs, a spreader element attached to one of said legs and extending transversely therefrom, said spreader element having an intermediate central portion in axial alignment with the aperture in said top and arms extending radially from said central portion toward said legs and having end portions forming operative connections with the ends of said legs for imparting radial outward movement thereto, said arms sloping in an axial direction away from said central portion and from said top, and an inwardly projecting lip formed on the end of the other of said legs to prevent axial displacement of the arm of said spreader in engagement therewith.

5. A fastener insert comprising a single sheet metal member having a top portion provided with an aperture therein, a plurality of legs extending transversely from said top portion in converging relation to each other and to the axis of said aperture and having outwardly extending teeth formed on the side edges thereof, a spreader member engaging the end portions of said legs for moving said legs radially outwardly, said spreader member comprising a plurality of radially disposed arms sloping inwardly from said legs toward said top and having a common intermediate portion disposed in axial alignment with said aperture, one of said arms being formed as a continuation of one of said legs and the radial outer free ends of the other of said arms abutting the other of said legs, and means forming an operative connection between the free ends of said arms and said legs for preventing axial displacement to said arms relative to said legs.

THOMAS A. McCOLLUM.

REFERENCES CITED

The following references are of record in the file of this patent:

UNITED STATES PATENTS

| Number | Name | Date |
| --- | --- | --- |
| 2,037,122 | Despard | Apr. 14, 1936 |
| 2,049,585 | Gunthrop | Aug. 4, 1936 |
| 2,370,327 | Rosan | Feb. 27, 1945 |

FOREIGN PATENTS

| Number | Country | Date |
| --- | --- | --- |
| 463,414 | Great Britain | Mar. 30, 1937 |